United States Patent Office 2,780,605
Patented Feb. 5, 1957

2,780,605

POLYMERIZATION OF STYRENE IN HEVEA LATEX

Edward M. Bevilacqua, Allendale, N. J., assignor to United States Rubber Company, New York, N. Y., a corporation of New Jersey No Drawing. Application July 16, 1953,
Serial No. 368,507

5 Claims. (Cl. 260—2.5)

This invention relates to improvements in the polymerization of styrene in Hevea rubber latex to give a product in which the maximum amount of the polymerized styrene is chemically combined with the rubber.

I have found that the polymerization of styrene in admixture with Hevea rubber latex (hereinafter called "natural latex") in the presence of added surface-active dispersing agents, which is the conventional method of copolymerizing two or more polymerizable monomers and which has been suggested as the method for copolymerizing styrene with natural latex, does not give a product in which substantially all the styrene is chemically combined with the rubber, but gives a product in which a large proportion of the polymerized styrene is in the form of individually separate or free polysytrene particles, so that the product is similar to a mixture of natural latex and polystyrene latex. I have found further that in the presence of such added surface-active dispersing agents, the greater the percentage of water in the polymerization system, the greater will be the percentage of the polymerized styrene in the form of free polystyrene particles, and conversely the smaller will be the percentage of the polymerized styrene in the form of a copolymer in combination with the rubber. I have found that the product in which a large proportion of polymerized styrene is in the form of free polystyrene particles in admixture with the rubber particles, produced either by polymerizing the styrene in the natural latex in the presence of added surface-active dispersing agents or by mixing the natural latex with a separately prepared polystyrene latex does not have the improved valuable properties of the latex prepared according to the present invention where the preponderant amount of polymerized styrene is chemically combined with the rubber, particularly where the latex is to be used directly, as in foam sponge manufacture, as an adhesive and as in the direct manufacture of products requiring high tearing strengths as in latex dipped wire and other manufactures. Also, vulcanized solid molded and other products produced from coagula of the latices prepared according to the present invention give a much higher abrasion resistance than similar products made from mixtures of natural latex and polystyrene latex.

According to the present invention, styrene is polymerized in natural latex so that less than five percent of the total polymerized styrene is present in the latex product as free polystyrene particles and, conversely, over ninety-five percent of the total polymerized styrene is chemically combined or copolymerized with the rubber in the latex product.

In carrying out the present invention, the styrene is polymerized in admixture with alkaline natural latex and a polymerization catalyst and in the absence of additional surface-active dispersing agents other than those found in the normal or concentrated natural latex as received in this country, and in which mixture the range of water is adjusted to 28%–45% by weight of the mixture. The present invention is applicable to the copolymerization of rubber and ring-methylated styrenes (o-, m-, or p-methylstyrene) which are equivalents of styrene in copolymerization with rubber. The amount of styrene in the mixture may be from 5% to 60%, and is preferably 20% to 60%, by weight of the rubber content of the natural latex. The alkaline natural latex may be normal or concentrated and is commonly preserved with 0.6% to 1% of ammonia, but may be preserved with a smaller amount of ammonia such as 0.2% where an additional bactericide is added in the preservation thereof. The alkaline preservative, as is known, hydrolyzes naturally occurring esters in the latex to form a small amount of soap with the result that the rubber particles are entirely or nearly covered with soap, as shown by the low surface tension of normal or concentrated alkaline natural latex as it is received in this country, in the range of 32 to 38 dynes/cm. The success of the present process depends on the substantial absence of micelles of surface-active material in the aqueous phase of the reaction mixture, since, as discussed above and as will be shown in the examples below, the styrene will polymerize in the micelles, if they are present in the aqueous phase, to produce separate polystyrene particles instead of entering the rubber particles where reaction or copolymerization of the styrene and the rubber can occur. The addition of only a very small amount of surface-active dispersing agent, e. g. as little as 0.1% based on the latex solids, may well produce substantial amounts of micelles of surface-active material in the aqueous phase, in which the styrene will polymerize to free polystyrene. As a means of measurement which will show the absence of any substantial amount of micelles in the aqueous phase in which free polystyrene will be formed, the surface tension of the mixture of all the ingredients of the reaction mixture except styrene should not be below 32 dynes/cm., e. g., it will be in the range of the natural latex itself, from 32 to 38 dynes/cm. The polymerization catalyst may be a water-soluble peroxygen catalyst, such as an alkali (sodium, potassium or ammonium) salt of persulfuric acid. Since dry salts may destabilize the latex if added directly, they should first be wet with water or be added as aqueous solutions, as in the case of ammonium persulfate. The catalyst may also be an organic hydroperoxide or an azo catalyst, viz., one containing an azo (—N=N—) group, e. g. alpha, alpha'-azobis-iso-butyronitrile, which may be dissolved in the styrene or added directly to the natural latex. With an organic hydroperoxide catalyst, the reaction may be accelerated by addition of an alkylene 1,2-polyamine as in so-called perox amine catalyst polymerizations, or by addition of a small amount of a reducing agent as in so-called redox polymerizations. The amount of such free-radical polymerization catalyst may be in the range of 0.2 to 2 or more parts by weight based on the rubber content of the reaction mixture. The reaction may be carried out at any convenient temperature, e. g., from 0° C. to 100° C. With ammonium persulfate as the catalyst, the reaction will be substantially complete in about three days at room temperature (25° C.), or in a few hours at 60° C. With cumene hydroperoxide and ethylene diamine (peroxamine catalyst system), the reaction will be substantially complete in a few hours at 30° C. With alpha, alpha'-bis-isobutyronitrile catalyst the reaction will be substantially complete in 24 hours at 50° C. It is desirable to avoid free access of oxygen to the reaction mixture during polymerization; thus, it is preferable to carry out the polymerization in a closed vessel nearly filled with the reaction mixture or under an inert atmosphere, e. g., nitrogen. The styrene and catalyst should initially be thoroughly stirred into the natural latex, but the reaction mixture need not be stirred after the initial mixing, although continuous stirring may be used if convenient. In order to assure continued stability of the reaction mixture during the polymerization without the introduction of micelle-forming surface-active dispersing agents, there should be added to the reaction mixture a small amount of an alkali metal hydroxide, for example, 0.2 to 2% by weight of sodium or potassium hydroxide based on the weight of rubber component of the reaction mixture.

The product of the present invention has various advantages, particularly in the manufacture of articles directly from it as in foam sponge manufacture and various dipped products, such as dipped metal wire for insulated electrical conductors. The polymerization of the styrene outside the latex particles, which occurs when micelles are present in the aqueous phase by virture of added surface-active dispersing agents, has various disadvantages which are overcome by the present process. When polymerization occurs outside the rubber particles, the product contains a mixture of polystyrene particles similar to that which would be obtained by merely blending the natural latex and a previously prepared polystyrene latex. It is known that in certain applications, such blends of natural latex and polystyrene latex yield cured films of higher modulus than films from unmodified natural latex, but the addition of the polystyrene latex also imparts a lack of resiliency. Foam sponges made from mixtures of polystyrene latex with natural latex have a "dead" feel, being sluggish in their response to applied force. The rubber prepared from latex prepared according to the present invention has the desired resiliency, and in addition, in latex foam spronge it gives a product which is stiffer than that from either natural latex or from mixtures of polystyrene latex with natural latex. The superiority of latex foam sponge produced from latex of the present invention lies in its higher compression resistance or load carrying capacity as compared with foam made from natural latex. This higher load carrying capacity means that less material is required to obtain the same resistance to compression or alternatively, a greater resistance to compression, can be obtained with the same density sponge. Other advantages are inherent in this invention. The product of the present invention is stable indefinitely whereas ordinary mixtures of polystyrene latex with natural latex require a large amount of added stabilizer, if they are not be used immediately. The latex of the present invention can also be diluted and reconcentrated, as by creaming, without significant change in composition of its solids content or in its properties because the styrene is intimately bound to the rubber and the particles of copolymerized styrene and rubber will cream in the presence of a conventional hydrophilic colloidal creaming agent. On the other hand, where the sytrene is in the form of individual polystyrene particles as in mixtures of the two latices or where surface active dispersing agents are used in the reaction mixtures, the rubber particles will rise during creaming but the polystyrene particles remain in the skim portion separated from the rubber in the cream.

The following examples illustrate the present invention, all parts and percentages referred to herein being by weight:

*Example I*

Twelve hundred grams of a commercial concentrated Hevea latex (preserved with 0.9% ammonia) containing 67.0% total solids, were placed in a two-quart container. To this were added 28 grams of 10% aqueous potassium hydroxide, 200 grams of water and 240 grams of styrene in that order. After seventeen hours at room temperature, eight grams of ammonium persulfate dissolved in 25 grams of water was added and the container sealed. The mixture was left overnight at 50° C. Next day the product was a fluid latex of 62.1% total solids content, corresponding to a polymerized styrene content of 23.1% of the latex solids. This latex after five months was still fluid and useful (for example, for the preparation of foam), as compared with a mixture of polystyrene latex and the same commercial latex which became unstable within a few days after mixing.

Two other latices were prepared according to the invention by the same procedure, except that the ratio of styrene to latex was varied to give 20.0% and 28.6% interpolymerized styrene content.

The above three rubber-and-styrene copolymer latices were compounded for vulcanization, as were, for comparison, mixtures of polystyrene latex with the natural rubber latex used, containing the same ratio of styrene to total solids. The formula used contained 2.0 parts of potassium oleate, 5.0 parts of zinc oxide, 1.5 parts of sulfur, 1.25 parts of a zinc salt of benzothiazolethione and 0.65 part of zinc diethyldithiocarbamate, per hundred parts of rubber component. Films from each latex were dried, and cured in air 90 minutes at 110° C. The products from the above three copolymer latices had a higher modulus, i. e. were much stiffer than corresponding films from mixed natural latex and polystyrene latex, as shown by the following data.

| Polymerized Styrene (Percent of Total Hydrocarbon) | Modulus (p. s. i.) at 300% Elongation | |
|---|---|---|
| | Styrene-Rubber Copolymer Latex | Mixed Natural Latex+Polystyrene Latex |
| 20.0 | 1,000 | 600 |
| 23.3 | 1,100 | 670 |
| 28.8 | 1,440 | 875 |

For comparison, corresponding films from similarly compounded unmodified natural latex had a 300% modulus of about 250 lbs. per sq. in. (p. s. i.).

*Example II*

Examination of electron photomicrographs of the latices of Example I and sample A below according to the present invention shows that the styrene has entered into the rubber latex particles and reacted there, substantially no separate polystyrene particles being visible. When surface-active agents were added to the latex as stabilizers before polymerization as in samples B, C and D below, polystyrene particles were formed external to the styrene-rubber copolymer particles and became visible in the electron photomicrographs. Also, as shown below, the polystyrene particles can be mechanically separated from the particles in which the styrene has been copolymerized with the rubber.

Four latices were made, using the following proportions by weight:

| | A | B | C | D |
|---|---|---|---|---|
| Natural Rubber Latex (67.5% Total Solids) | 150 | 150 | 150 | 150 |
| Potassium Hydroxide | 0.25 | 0.25 | 0.25 | 0.25 |
| Potassium Oleate | 0 | 1 | 2 | 5 |
| Ammonium Persulfate | 1 | 1 | 1 | 1 |
| Styrene | 35 | 35 | 35 | 35 |

The hydroxide, soap and persulfate were added as aqueous solutions and sufficient water was added to bring the total weight to 222 parts. The mixtures were allowed to react two days at 30° C., whereupon approximately 90% of the styrene was found to have reacted. Each of the latices was then diluted with a 0.5% aqueous ammonia solution containing sufficient ammonium alginate creaming agent to give a final mixture containing 0.06% of alginate on the aqueous phase and 25% total solids. These mixtures were allowed to stand in cylindrical separatory funnels at room temperature. A sample of the untreated natural latex was treated in the same way. After one day at room temperature all the mixtures had separated into two layers, a supernatant high-solids cream and a low-solids skim. The lower skim layer of each mixture was separated from the cream and its total solids content determined. The polystyrene particles will not cream under these conditions but remain in the skim.

The results given in the table below show that with increasing amounts of soap the latices contained increasing amounts of free polystyrene particles:

| Latex | Total Solids in Skim (Percent) | Increase in Skim Solids over Natural Latex | Percent of Total Polymerized Styrene Present as Free Polystyrene Particles |
|---|---|---|---|
| Natural Latex | 1.49 | | |
| A | 1.74 | 0.25 | 3.2 |
| B | 3.25 | 1.76 | 23.1 |
| C | 5.22 | 3.73 | 47.2 |
| D | 7.28 | 5.79 | 80.0 |

It may be readily seen that less than 5% of the polymerized styrene in sample A according to my invention is present in the form of polystyrene particles.

In diluting other samples of the recipe of sample C above with water to totals of 246, 347 and 497 parts before polymerization, the percent free polystyrene was increased from 47.2% to 50.4%, 52.0% and 58.0%, respectively, showing that the greater the percentage of water in a polymerization system containing added surface-active dispersing agents, the greater will be the percentage of free polystyrene particles in the aqueous medium.

*Examples III to VI*

In Examples III to VI, the improvement in compression resistance of foam sponge made from the rubber-styrene copolymer latex according to this invention over that of sponge made from natural latex foam is shown by comparison with controls made from a commercial Hevea latex concentrate. The compression resistance of foam sponge is a function of the dry density of the foam, of the amount of sulfur used in the compound, and of the manner in which setting and curing are carried out. In order to minimize the effects of these variables, the same combination of compounding ingredients and procedure was used for making each sample of foam sponge. The compounding recipe used contained soap and curatives in the proportions by weight shown in the following table:

Ingredient: Parts (dry weight)
Rubber component of latex used _____ 100
Potassium oleate _____ 2.8
Zinc oxide _____ 5.0
Sulfur _____ 1.5
Zinc salt of benzothiazolethione _____ 1.25
Zinc diethyldithiocarbamate _____ 0.65

Potassium oleate was added as a 20% aqueous solution, the other ingredients as standard compounding pastes dispersed with conventional dispersing agents. The samples were whipped to a froth of the desired density to which 6 parts of a 50% aqueous slurry of sodium silico-fluoride was added. The froths were molded and vulcanized by heating in an oven at 120° C. for 2 hours, washed, and dried 4 hours at 60° C. The density and the resistance to compression to 75% of the initial height of the sponge samples were determined after the samples had aged overnight.

*Example III*

A commercial Hevea latex of 67.7% total solids content was mixed with styrene, water, potassium hydroxide, and ammonium persulfate in the following proportions:

Natural latex (67.7% T. S.) _____ 900
10% potassium hydroxide solution _____ 24
Water _____ 120
Styrene _____ 240
10% ammonium persulfate solution _____ 72

The materials were added in the order given in the table, with stirring during the addition. The container, which had a volume of 2 quarts, was sealed and allowed to stand at room temperature (27° C.) for 3 days. At the end of this time the latex had a total solids content of 61.7%, corresponding to 35.6 grams of styrene polymerized per 100 grams of original latex total solids. This latex was made into foam sponge as described in the paragraph above. At a foam density of 0.080 the load carrying capacity was 1.77 times that of foam sponge of the same density made from the same natural rubber latex unmodified.

*Example IV*

In this example, the ingredients were mixed in the following proportions by weight:

Natural latex (66.0% T. S.) _____ 2550
10% potassium hydroxide _____ 59.5
Water _____ 170
Styrene _____ 476
20% ammonium persulfate _____ 68

After 3 days at room temperature the total solids was 63.9% corresponding to a styrene/rubber ratio of 0.241. At a foam sponge density of 0.093, the load carrying capacity of foam from this latex was 1.54 times that of the control.

*Example V*

In this example, the ingredients were mixed in the following proportions by weight and allowed to react 3 days at 30° C.:

Latex (67.7% T. S.) _____ 150
10% potassium hydroxide _____ 3
Water _____ 7
Styrene _____ 25
10% ammonium persulfate _____ 10

The total solids of this latex was 64.2% corresponding to a combined styrene content equal to 20.5% of the natural rubber. At a density of 0.11 the foam sponge from this latex had 1.33 times the compression resistance of the control.

*Example VI*

Foams were made from blends of the styrene-rubber copolymerized latices of Examples III and IV with unmodified natural rubber latex. As the amount of unmodified latex was increased, the compression resistance of the foam fell toward that of foam made entirely from unmodified latex, but appreciable improvements were found in all cases, e. g., even when the ratio of styrene component to total rubber component was only 0.1. Results are shown in the following table:

| Foam Sponge from Copolymer Latex of— | Polymerized Styrene Component in Blend (Percent of Total Rubber Component) | Sponge Density (gms./cc.) | Ratio of Compression Resistance to That of Control at Same Density |
|---|---|---|---|
| Example III | 21.7 | 0.099 | 1.43 |
|  | 19.3 | 0.102 | 1.32 |
| Example IV | 12.1 | 0.105 | 1.15 |
|  | 10.0 | 0.093 | 1.19 |

In contrast to the results shown in Examples III, IV, V and VI, the resistance to compression of foam made from mixtures of polystyrene latex with natural rubber latex is essentially the same as that of foam from rubber latex alone: three foams were made containing 15%, 20% and 25% by weight of polystyrene added as latex based on the rubber, with the same compounding formula as in these examples. The compression resistances relative to natural rubber foam sponge control at the same densities were 0.95, 0.95 and 1.06, respectively. The foams from mixtures of polystyrene latex exhibited the sluggish response to deformation familiar in foam loaded with organic fillers. All the foams of Examples III, IV, V and VI were "lively" and had the rapid recovery characteristic of natural latex foam.

*Example VII*

Four copolymer latices were made according to the present invention with the following recipes:

|  | E | F | G | H |
|---|---|---|---|---|
| Natural Rubber Latex (67.5% Total Solids) | 150 | 150 | 150 | 150 |
| Potassium hydroxide | 0.35 | 0.35 | 0.35 | 0.35 |
| Ammonium persulfate | 1 | 1 | 1 | 1 |
| Styrene | 10 | 20 | 30 | 40 |
| Water | 43 | 43 | 43 | 43 |

The mixtures were allowed to react 30 hours at 30° C., approximately 90% of the styrene having reacted in this time.

Samples of the above latices were coagulated by drying in a stream of air, and an amount of each copolymer containing 100 parts of rubber component compounded on a mill with the following ingredients: Stearic acid 3 parts; zinc oxide 5 parts; accelerator 0.8 part; sulfur 2 parts; antioxidant 1 part. The samples were vulcanized in a mold at 287° F. for 40 minutes. Samples I, J, K and L were prepared by mixing the same natural latex with a separately prepared polystyrene latex in amounts to give ratios of polystyrene to rubber which were the same as the ratios of polymerized styrene to the rubber component in samples E, F, G and H respectively. They were similarly dried, compounded and vulcanized.

Comparative abrasion resistance tests showed cured sample E had 130% of the abrasion resistance of cured sample I; cured sample F had 142% of the abrasion resistance of cured sample J; cured sample G had 176% of the abrasion resistance of cured sample K; and cured sample H had 240% of the abrasion resistance of cured sample L.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method which comprises contacting with a free-radical polymerization catalyst a mixture consisting essentially of water, Hevea rubber in latex form, 5 to 60 parts by weight of polymerizable material comprising a member of the group consisting of styrene and ring-methylated styrenes per 100 parts of rubber content of the latex, and an alkali-metal hydroxide which is present in amount up to 2 parts per 100 parts of rubber in the latex, the water content being 28% to 45% by weight of the mixture, for a time sufficient to react the said polymerizable material with the rubber.

2. The method which comprises contacting with a peroxygen catalyst a mixture consisting essentially of water, Hevea rubber in latex form, 5 to 60 parts by weight of styrene per 100 parts of rubber content of the latex, and 0.2 to 2 parts of alkali-metal hydroxide per 100 parts of rubber in the latex, the water content being 28% to 45% by weight of the mixture, for a time sufficient to react the styrene with the rubber.

3. The method which comprises contacting with ammonium persulfate a mixture consisting essentially of water, Hevea rubber in latex form, 5 to 60 parts by weight of styrene per 100 parts of rubber content of the latex, and 0.2 to 2 parts of alkali-metal hydroxide per 100 parts of rubber in the latex, the water content being 28% to 45% by weight of the mixture, for a time sufficient to react the styrene with rubber.

4. An aqueous emulsion polymerizate made by process of claim 1.

5. A molded and vulcanized foam sponge containing the dried solids of an emulsion polymerizate made by the process of claim 1.

References Cited in the file of this patent

UNITED STATES PATENTS 2,422,550   Jacobson _____ June 17, 1947

FOREIGN PATENTS 652,401   Great Britain _____ Apr. 25, 1951

OTHER REFERENCES

Ser. No. 437,596, Le Bras et al. (A. P. C.), published Apr. 20, 1943.

India Rubber World, July 1942, pp. 347–349.